United States Patent
Hoffman et al.

(10) Patent No.: US 7,152,373 B2
(45) Date of Patent: Dec. 26, 2006

(54) AUTOMOTIVE ATTACHMENT CONNECTOR FOR DOOR WINDOW

(75) Inventors: Belton Hoffman, Macomb, MI (US); Davinder Singh, Markham (CA)

(73) Assignee: Decoma International Inc., Concord (CA)

( * ) Notice: Subject to any disclaimer, the term of this patent is extended or adjusted under 35 U.S.C. 154(b) by 342 days.

(21) Appl. No.: 10/831,010

(22) Filed: Apr. 23, 2004

(65) Prior Publication Data

US 2004/0221512 A1 Nov. 11, 2004

(51) Int. Cl.
*B60J 5/04* (2006.01)
*E06B 7/16* (2006.01)

(52) U.S. Cl. .................. 49/502; 49/440; 296/146.1; 296/146.16

(58) Field of Classification Search ............ 49/502, 49/440, 441, 348, 349; 296/146.1, 146.2, 296/146.5, 146.15, 146.16
See application file for complete search history.

(56) References Cited

U.S. PATENT DOCUMENTS

| | | | | |
|---|---|---|---|---|
| 1,609,926 A | * | 12/1926 | Woodward | 49/423 |
| 1,701,969 A | * | 2/1929 | Brazell | 49/441 |
| 2,000,561 A | * | 5/1935 | Haberstump | 296/151 |
| 2,361,608 A | | 10/1944 | Doty | |
| 2,796,960 A | * | 6/1957 | Reynolds | 49/416 |
| 2,913,079 A | * | 11/1959 | Axe | 49/440 |
| 3,162,281 A | * | 12/1964 | Gaulien et al. | 49/374 |
| 3,383,800 A | * | 5/1968 | Sturtevant | 49/428 |
| 3,385,000 A | * | 5/1968 | Sturtevant et al. | 49/440 |
| 4,483,100 A | * | 11/1984 | Blankenburg et al. | 49/352 |
| 4,616,445 A | * | 10/1986 | Watanabe et al. | 49/374 |
| 4,910,914 A | * | 3/1990 | Asoh | 49/214 |
| 4,945,891 A | * | 8/1990 | Cecil | 126/299 D |
| 4,956,941 A | | 9/1990 | Vaughan | |
| 5,007,201 A | * | 4/1991 | D'Hoore et al. | 49/348 |
| 5,048,232 A | * | 9/1991 | Miyagawa et al. | 49/440 |
| 5,086,589 A | * | 2/1992 | dibenedetto | 49/502 |
| 5,315,788 A | * | 5/1994 | Bensinger et al. | 49/404 |
| 5,524,388 A | | 6/1996 | Chowdhury et al. | |
| 5,548,929 A | | 8/1996 | Larsen et al. | |
| 5,651,217 A | | 7/1997 | Mesnel | |
| 5,855,095 A | | 1/1999 | Dedrich et al. | |
| 5,867,942 A | * | 2/1999 | Kowalski | 49/502 |
| 5,899,522 A | * | 5/1999 | DeRees et al. | 296/181.2 |
| 6,021,609 A | | 2/2000 | Teishi | |

(Continued)

FOREIGN PATENT DOCUMENTS

GB 2204912 A * 11/1988

*Primary Examiner*—Hugh B. Thompson, II
(74) *Attorney, Agent, or Firm*—Clark Hill PLC

(57) ABSTRACT

A glass run channel assembly for mounting on the door frame of an automotive vehicle and for accommodating a glass run seal and a glass window comprising a glass run channel upper frame, a glass run guide, and a glass run lower frame frame, each having a bottom wall and two side walls disposed on either side of the bottom wall, forming a U-shape. In operation, the lower frame is slidably engaged within the guide until the lower frame converges with a lower frame stop formed by a side wall of the guide. A tab locator is formed in each of the two side walls of the upper frame to guide the guide as it slidably engages within the upper frame. Upon sliding within the upper frame, a channel upper stop formed in a side wall of the guide converges with one of the tab locators on the upper frame locator, thereby preventing the guide from sliding too far into the upper frame.

5 Claims, 2 Drawing Sheets

U.S. PATENT DOCUMENTS

| | | |
|---|---|---|
| 6,305,125 B1 | 10/2001 | Nozaki et al. |
| 6,364,397 B1 * | 4/2002 | Bordeaux et al. ........ 296/146.2 |
| 6,481,162 B1 | 11/2002 | Lim |
| 6,751,905 B1 * | 6/2004 | Daumal Castellon ........ 49/352 |
| 2002/0140566 A1 | 10/2002 | Sommer et al. |
| 2003/0089044 A1 | 5/2003 | Okahara |

* cited by examiner

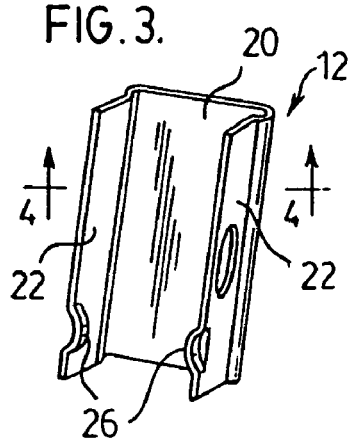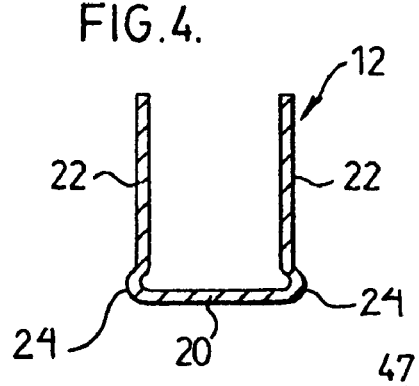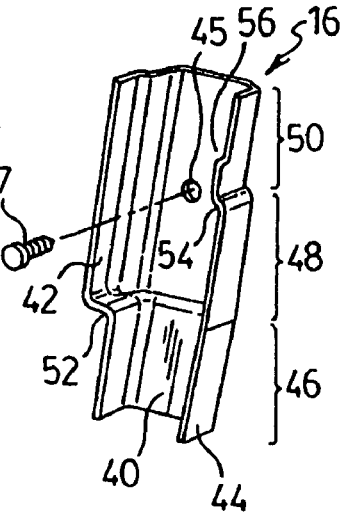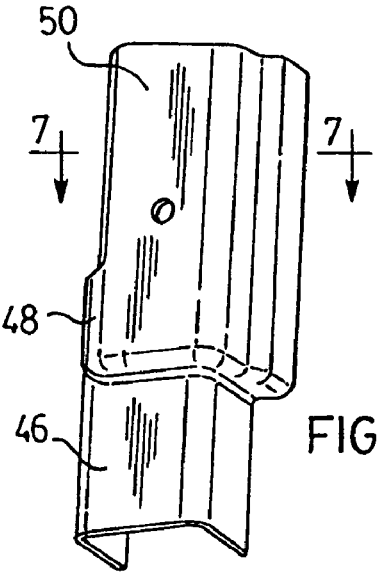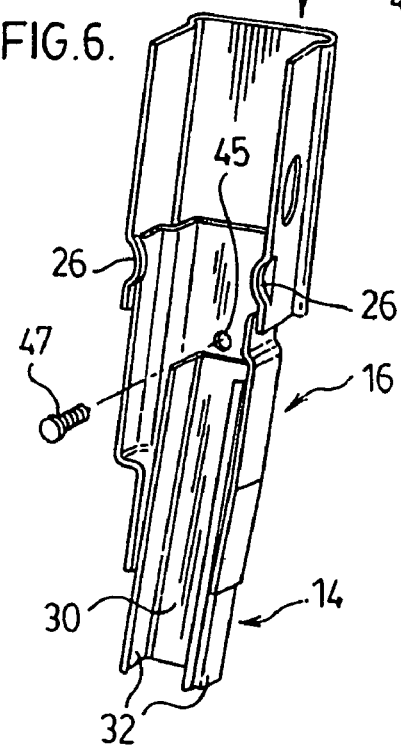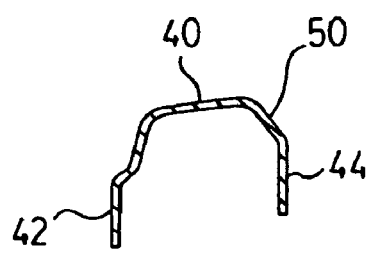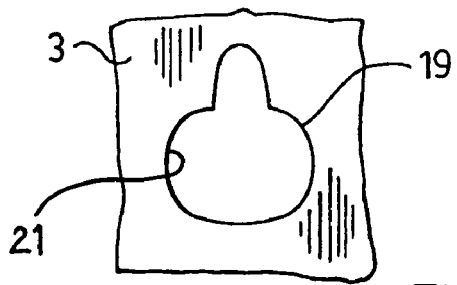

AUTOMOTIVE ATTACHMENT CONNECTOR FOR DOOR WINDOW

FIELD OF THE INVENTION

This invention relates to an attachment connector for a glass run channel. More particularly, this invention relates to glass run channel frames for inter-connection thereof and attachment to sheet metal doors.

BACKGROUND OF THE INVENTION

An automotive window glass is typically opened or closed vertically. A glass run channel assembly is provided between a window glass and a window frame to guide and enable the closing and opening movement of the window glass in a tight relationship with the window frame.

The glass run channel assembly typically includes a substantially U-shaped glass run channel frame, comprising a bottom wall and two side walls and a glass run seal disposed within the glass run channel frame. The conventional glass run seal is composed of a soft synthetic resin such as a soft vinyl chloride resin or a vulcanized rubber such as an ethylene/propylene/diene copolymer rubber and is also substantially U-shaped and provided with a groove and tonguelike draining parts.

The glass run channel frames are typically connected to sheet metal doors of automobiles. However, the area in which these frames are installed is most often a very tight space with very limited visibility. While the prior art has tried to accommodate these space and visibility limitations, the types of frames and methods of attachment suffer from difficult assembly due to requiring the installer to see the frames in order to correctly install them, which is difficult due to the tight space and lack of visibility. In addition, the prior art channels typically suffer from a lack of strength.

Therefore, there is a need for improved glass run channel frames that offer ease of manufacturing and simple assembly and installation, without compromising the strength of the frames.

SUMMARY OF THE INVENTION

It is desirable to provide guide or an attachment connector for an automotive door that enables easy, remote installation of the glass run channel.

According to one aspect of the invention there is provided a glass run channel assembly for mounting on the door frame of an automotive vehicle and for accommodating a glass run seal and a glass window. The glass run channel assembly has an upper frame, a lower frame locator or guide, and a lower frame, each having a bottom wall and two side walls disposed on either side of the bottom wall, forming a U-shape. The lower frame is slidably engaged within the frame locator until the lower frame converges with a lower frame stop formed by a side wall of the frame locator. A tab locator is formed in each of the two side walls of the upper frame to guide the frame locator as it slidably engages within the upper frame. Upon sliding within the upper frame, a channel upper stop formed in a side wall of the lower frame locator converges with one of the tab locators on the upper frame locator, thereby preventing the frame locator from sliding too far into the upper frame.

According to another aspect of the invention, there is provided a guide for a glass run channel assembly. The guide has a bottom wall and two side walls defining a U-shaped cross-section. One of the side walls includes a lower frame stop providing a stopping point for a lower frame as the lower frame slidably engages within the guide and a channel upper stop formed to provide a stopping point for an upper frame as the guide slidably engages within the upper frame.

BRIEF DESCRIPTION OF THE DRAWINGS

Exemplary embodiments of the invention will now be described in conjunction with the following drawings wherein like numerals represent like elements, and wherein:

FIG. 3 is a perspective view of a glass run channel upper frame;

FIG. 4 is a cross-sectional view of a glass run channel upper frame taken along line 4—4 of FIG. 3;

FIG. 5a is a perspective view of a glass run guide;

FIG. 5b is a perspective view of the glass run guide from a reverse angle from FIG. 5a;

FIG. 6 is a perspective view of a glass run channel assembly;

FIG. 7 is a cross-sectional view of the glass run guide taken along line 7—7 of FIG. 5b; and FIG. 8 is a partial elevational view of a keyhole in the door panel of FIG. 1.

DETAILED DESCRIPTION OF THE PREFERRED EMBODIMENTS

Figure 1:
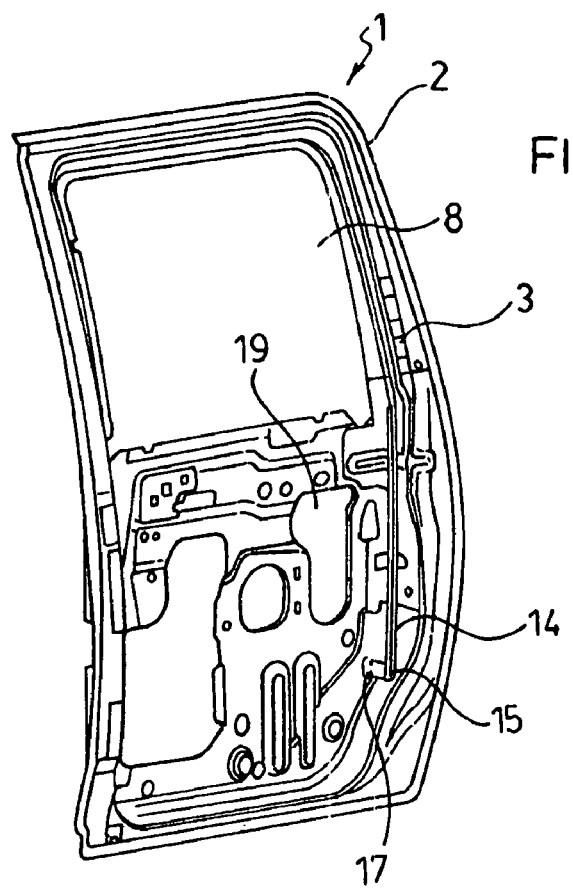
FIG. 1 is a perspective view of an automotive vehicle door frame.
Figure 2:
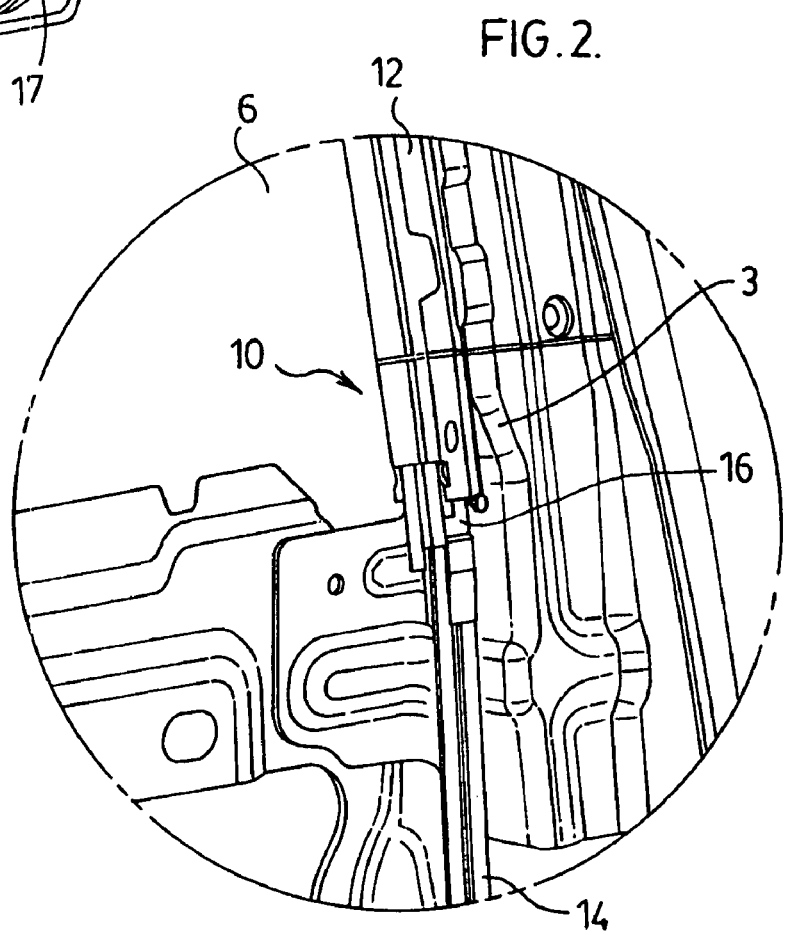
FIG. 2 is an enlarged partial perspective view of an automotive vehicle door frame with a glass run channel assembly.

Referring to FIGS. 1 and 2, a glass run channel assembly 10 is attached along an inner panel 3 of a door frame 2 of a door 1 of an automotive vehicle for use with a glass run seal to guide a window 8 upward and downward between its closed and open positions, respectively. The glass run channel assembly 10 includes an elongate upper frame 12, an elongate lower frame 14, and a guide or channel locator 16. The door frame 2 also includes an outer panel (not illustrated) defining a very narrow space therebetween. As is well known in the art, the upper edge of the inner and outer panels converge leaving a very narrow opening for a belt line molding and the window panel to extend therethrough. The amount of space available for installing the glass run channel is very limited.

Referring to FIGS. 3 and 4, the upper frame 12 has a substantially U-shaped cross-section of a first width, formed by a bottom wall 20 and two side walls 22, disposed on either side of the bottom wall 20. Preferably, the upper frame 12 is formed such that the transition between the side walls 22 to the bottom wall 20 results in a curved section 24 on either side of the bottom wall 20. The curved sections 24 will help to better retain the glass run seal, which will be disposed within the channel assembly 10, as discussed infra. The upper frame 12 further includes two tab locators 26, one on each side wall 22. The tab locators 26 are located across from each other and are formed at the upper edge of each side wall 22, opposite the bottom wall 20. The tab locators 26 are preferably stamped structures, semi-circled in shape, with the circumferential edge of the semi-circle extending towards the center of the upper frame 12. Upon slidably engaging the guide 16 within the upper frame 12, as will be discussed infra, the tab locators 26 engage the guide 16, resulting in a self-aligning joint. In addition, at least one of the tab locators 26 will provide an abutment or stopping point, preventing the guide 16 from sliding too far within the upper frame 12.

Referring to FIGS. 5a and 5b, the guide 16 has a substantially U-shaped cross section and is formed by a bottom wall 40 and two side walls 42, 44, disposed on either side of the bottom wall 40. The bottom wall 40 further includes an aperture 45, such as a round hole, to accommodate a pilot pin 47 that will pass therethrough for aligning the guide 16 with the lower frame 14 during a fixing process, such as spot welding.

The guide 16 has three main sections of varying widths, 46, 48, and 50. Section 46 of the guide 16 is the lowermost section and engages the lower frame 14 when the channel assembly 10 is fully assembled. The width of section 46 is slightly larger than the width of the lower frame 14, allowing for the lower frame 14 to be slidably engaged inside section 46 of the guide 16 prior to fixed attachment, such as spot welding.

Section 48 of the guide 16 is the middle of the three sections, located between sections 46 and 50. At the border of sections 46 and 48, the width of the guide 16 increases to a width slightly wider than that of the upper frame 12. This widening is accomplished by the side wall 42 bending outward away from the center of the guide 16 at the border of sections 46, 48, thereby forming an L-shaped elbow 52.

Section 50 of the guide 16 is the topmost section of the guide 16, and engages the upper frame 12 when the channel assembly 10 is fully assembled. The cross section of the upper section 50 is an irregular U-shape. The particular shape depends on the configuration of the guide 16 that is utilized in the upper frame 12. At the border of sections 48 and 50, the width of the guide 16 decreases. The side wall 44 bends inward toward the center of the guide 16, thereby forming a L-shaped lower frame stop 54 and resulting in the width of section 50 of guide 16 to be slightly less than that of upper frame 12, thereby allowing the guide 16 to be slidably engaged within the upper frame 12. Upon slidably engaging the lower frame 14 within the guide 16, the lower frame stop 54 prevents the lower frame 14 from sliding beyond the location of the lower frame stop 54.

In between the lower frame stop 54 and the edge of section 50, which also constitutes the topmost edge of guide 16, the height of side wall 44 decreases, resulting in an L-shaped channel upper stop 56 at the point of height transition of side wall 44. Upon slidably engaging the guide 16 within the upper frame 12, one of the tab locators 26 of the upper frame 12 converges with the channel upper stop 56 of the guide 16, thereby preventing the guide 16 from sliding past the location of the channel upper stop 54.

Referring to FIG. 6, the lower frame 14 also has a substantially U-shaped cross section, formed by a bottom wall 30 and two side walls 32, disposed on either side of the bottom wall 30. Lower frame 14 is slightly narrower than the guide 16, which enables the lower frame 14 to be slidably engaged within the guide 16 and positioned for permanent attachment, such as spot welding. The lower end of frame 14 has an S-shaped flange 15 (FIG. 1). Flange 15 is provided with a fastener 17 that is partially inserted through a bore.

In operation, the lower frame 14 is attached to the guide 16. The combination of the lower frame 14 and guide 16 is then slid through an opening 19 in the inner door frame 2. The fastener 17 at the lower end of frame 14 is inserted through a keyhole 21 provided in the inner panel 3 of door frame 2. The keyhole 21 has the larger diameter at a lower position than the smaller diameter. The keyhole 21 is positioned on the inner panel 3 so that when the fastener 17 is inserted therethrough, the upper end of guide 16 is immediately below the lower end of upper frame 12.

The guide 16 locates the lower frame 14 relative to the upper frame 12. Once the lower frame 14 and guide 16 combination is in place, the lower frame 14 and guide 16 are urged upwardly into upper frame 12, using the tab locators 26 as guides and until stopped by one of the tab locators 26 encountering the channel upper stop 56. Once the guide 16 is in place, the fastener 17 that is now in the upper narrow end of the keyhole 21, is tightened, affixing the channel assembly 10 to the door frame 2. More importantly, the present invention enables the installer to attach the channel assembly 10 blindly. These features result in a glass run channel assembly 10, which allows for an easy to install, self-aligning, jointed assembly without sacrificing the strength necessary for such a joint.

Once the channel assembly 10 is installed on the door frame 2, a typical installation of a glass window and glass run seal is possible. For example, a glass run seal can be placed in the channel assembly 10. Preferably, the seal is fixedly attached in the channel assembly 10 via glue, vulcanization, toy tabs, or the like to avoid sliding of the glass run seal. The glass run seal may include a convenient, substantially V-shaped molded form on its end to avoid glass misalignment.

The above described embodiments of the invention are intended to be examples of the present invention and numerous modifications, variations, and adaptations may be made to the particular embodiments of the invention without departing from the scope of the invention, which is defined in the claims.

What is claimed is:

1. A glass run channel assembly for a door frame of an automotive vehicle to accommodate a glass run seal and a glass window, said glass run channel assembly comprising:
    an elongate upper frame adapted to be fixedly secured to the door frame, said upper frame having a substantially U-shaped cross section of a first width;
    an elongate lower frame having a substantially U-shaped cross section of a second width; and
    a guide slidably interconnecting said upper frame and said lower frame to locate said lower frame relative to said upper frame.

2. A glass run channel assembly as set forth in claim 1, wherein said guide has a bottom wall and two side walls defining a U-shaped cross-section and one of said walls includes a lower frame stop providing a stopping point for said lower frame as it slidably engages within said guide.

3. A glass run channel assembly as set forth in claim 2, wherein said upper frame further includes a tab locator formed in each of said side walls to guide and self-align said lower frame locator as it slidably engages within said upper frame.

4. A glass run channel assembly as set forth in claim 3, wherein said guide further includes a channel upper stop formed by one of said side walls to provide a stopping point by engaging with one of said tab locators of said upper frame while said guide is slidably engaging within said upper frame.

5. In combination, a guide and a glass run channel,
    said guide comprising a bottom wall and two side walls defining a U-shaped cross-section and one of said walls includes a lower frame stop providing a stopping point for a lower frame as said lower frame engages within said guide and a channel upper stop formed by one of said side walls to provide a stopping point for an upper frame as said guide slidably engages within said upper frame; and said glass run channel comprising a U-shaped frame having a first end engaging said guide and having a fastener extending therefrom, said fastener positioned to engage a keyhole in door panel such that when said fastener is positioned in the keyhole, the guide is positioned for insertion into said upper frame and as said fastener moves to a narrow end of the keyhole, the guide slidably engages said upper frame and thereafter, the fastener affixes the combination to a vehicle door frame.

* * * * *